United States Patent
Masilamany

(10) Patent No.: US 6,778,523 B1
(45) Date of Patent: Aug. 17, 2004

(54) CONNECTIONLESS ORIENTED COMMUNICATIONS NETWORK

(75) Inventor: Raguparan Masilamany, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/481,406

(22) Filed: Jan. 12, 2000

(51) Int. Cl.[7] .............................................. H04L 12/28
(52) U.S. Cl. .................. 370/351; 370/395.65; 370/353
(58) Field of Search ................................ 370/351, 354, 370/356, 389, 395.52, 400, 401, 402, 422, 386, 392, 396, 399, 395.3, 395.31, 395.32, 395.53, 395.65, 404, 412, 413, 415, 417

(56) References Cited

U.S. PATENT DOCUMENTS

| | | | | |
|---|---|---|---|---|
| 5,905,872 A | * | 5/1999 | DeSimone et al. | 709/245 |
| 6,091,733 A | * | 7/2000 | Takagi et al. | 370/401 |
| 6,181,698 B1 | * | 1/2001 | Hariguchi | 370/392 |
| 6,243,754 B1 | * | 6/2001 | Guerin et al. | 709/227 |
| 6,404,738 B1 | * | 6/2002 | Reininger et al. | 370/236 |
| 6,502,135 B1 | * | 12/2002 | Munger et al. | 709/225 |
| 6,529,499 B1 | * | 3/2003 | Doshi et al. | 370/352 |
| 6,584,098 B1 | * | 6/2003 | Dutnall | 370/354 |

OTHER PUBLICATIONS

An article dowloaded from the Internet, entitled "IBM Diffserv Implementation Experiments", (http://search.ietf.org/internet–drafts/draft–nadas–diffserv–experience–01.txt), dated Sep. 1999.

* cited by examiner

Primary Examiner—Phirin Sam
(74) Attorney, Agent, or Firm—Greenblum & Bernstein, P.L.C.

(57) ABSTRACT

A connectionless oriented communications network is disclosed having a plurality of IP network routers R1–R3 controllable by a service controller S the service controller S being arranged to set a service across the network by configuration of at least some of the routers R1–R3, configuration instructions to determine packet forwarding behaviour sent from the service controller S to the routers R1–R3 being in a common form and each router R1–R3 having associated therewith a translation program for translating the common form instructions into configuration information specific to that router.

17 Claims, 3 Drawing Sheets

CONNECTIONLESS ORIENTED COMMUNICATIONS NETWORK

BACKGROUND AND FIELD OF THE INVENTION

This invention relates to a connectionless oriented communications network, more particularly to control of routers forming part of such a network.

Connectionless communications networks with quality of service (QoS) guarantees need to be capable of offering different types of network services to provide the users of the network services with the choice of different levels of service guarantees along with different pricing structures. The challenge of the network operators is configuring and managing their networks in order to cater to such types of services. Service configuration in term of either a "per flow" (i.e. application to application or user to user flows) or "aggregate" (i.e. a collection of such flows) basis requires configuring each router of the network with specific configuration information. This configuration information differs depending on the router's type, make, model and router's operating system. Thus, if different types of router are used in a particular network, complications arise, since the network operator, whether human or machine, would be required to know the different implementations of packet handling mechanisms of each router in order to configure a service through the network. This problem has caused network providers to use or select routers from a single manufacturer, leading to choice restriction and inflexibility.

It is an object of the invention to provide communication apparatus that alleviates this problem.

SUMMARY OF THE INVENTION

According to the invention, there is provided a connectionless oriented communications network having a plurality of internet protocol network routers for forwarding network packets and controllable by a service controller, the service controller being arranged to configure a service across the network by configuration of at least some of the routers, router configuration instructions to determine packet forwarding behaviour sent from the service controller to the routers being in a common form and each router having associated therewith means for translating the common form instructions into configuration commands specific to that router.

The present invention provides a connectionless oriented communications network which allows IP routers of any make and operating system to be used together in a network and configured in the same manner by a service controller using the common form instructions.

Preferably the configuration instructions comprise a first command reserving resources on the router and a second command committing the resources, the configuration information being derived from the commands only upon receipt of the second command. This allows a soft booking of resources to be made on each router so that router resources are not over committed before the requested service is actually configured.

Preferably, the translation means comprises a command template which includes commands for configuring the router in accordance with the configuration instructions.

Most preferably, each router includes means for providing local admission control which may a table of committed and reserved resources of the router and means for calculating further resources to be used in configuring a further service through that router.

Local admission control enables each router to make its own decisions concerning its ability to allocate resources and particularly allows at least one further service controller to be provided, with the service controllers being able to configure the routers independently.

Preferably, at least one said router is an IP version 4 or above.

The routers preferably split their resources using logically separated bit pipes and have an operating system, network resources being partitioned and admission controlled by the operating system.

Each configuration instruction is preferably identified by a unique identifier and each configuration instruction preferably determines packet forwarding behaviour independent of any other configuration instructions so that different configuration instructions can give rise to different packet forwarding behaviour.

BRIEF DESCRIPTION OF THE DRAWINGS

An embodiment of the invention will now be described by way of example with reference to the accompanying drawings in which.

DETAILED DESCRIPTION OF THE PREFERRED EMBODIMENT

Figure 1:
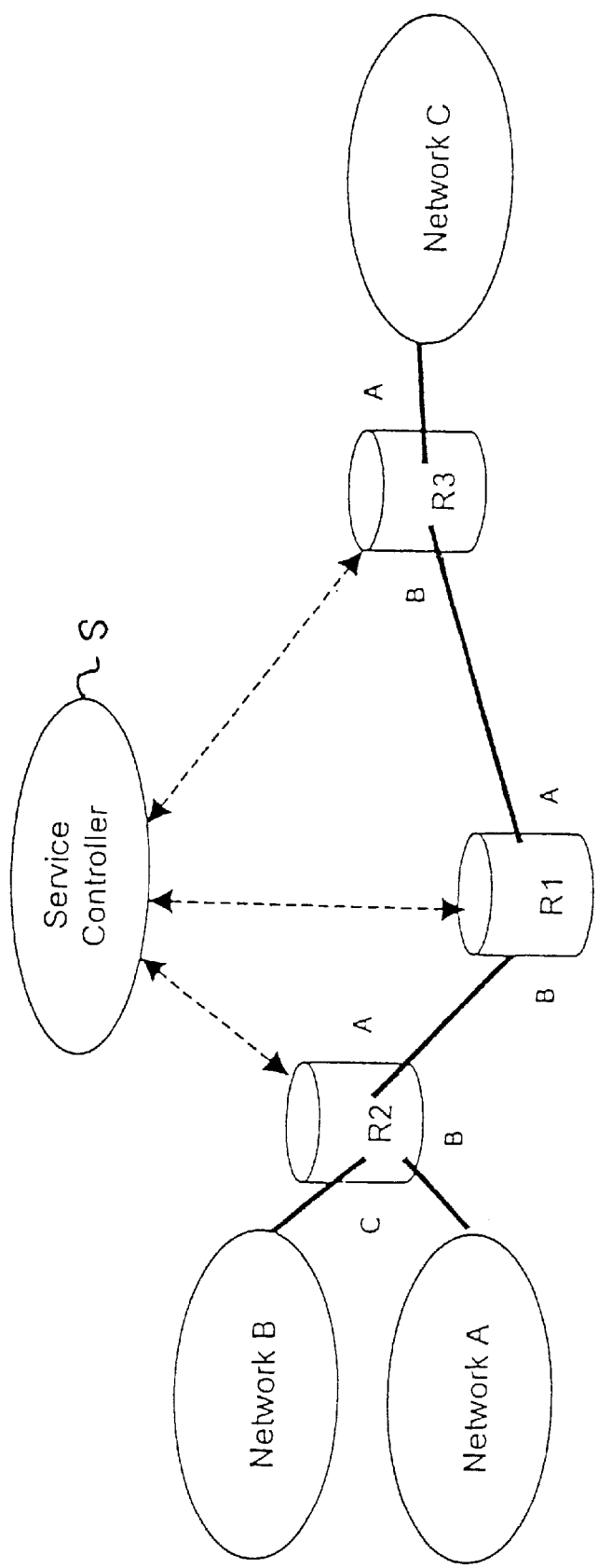
FIG. 1 illustrates the topology of an exemplary communications being an embodiment of the present invention.

A connectionless oriented communications network is illustrated in FIG. 1 and includes three source networks A, B and C connected via a core network represented by IP routers R1, R2 and R3. The routers are preferably IP version 4 (RFC 791) or IP version 6 (RFC 2460) and have physical interconnections providing communication paths between the source networks A, B and C shown by solid lines. A service controller S has a control link to each router, shown by dashed lines, and controls the configuration of the routers to determine packet forwarding behaviour in accordance with service requests received from subscribers of the source networks.

The service controller communicates with each router using a common form of instruction. Each router has software that translates the common form instruction into configuration information suitable for that router, Similarly, the software forwards acknowledgments in a common form to the service controller S. Generally, if the routers are from different manufacturers, the control interfaces and forwarding engines will be different, thus requiring different translation programs. However, the issue of composing routers to form a network becomes a programming issue rather than one, as in the prior art, based essentially on selection of hardware.

Another feature of the network is that the software program in addition to providing translation functions also provides local admission control by maintaining a database of the resources of the router and how those resources are allocated.

An example of the service creation process in conceptual terms using the embodiment of the invention in the network of FIG. 1 will now be described. The configuration of the services that have been agreed between users and the network provider is shown in Table 1. The service controller S retains this information. In this example the GOLD service offers stringent service guarantees compared to SILVER service. Moreover, it is assumed that router R1 is capable of per-flow queuing for high priority traffic and R2 and R3 are not.

TABLE 1

Service Level Agreement

| Service Number | Source Network | Destination Network | Service Type | Bandwidth (kbps) | Burst Size (packets) |
|---|---|---|---|---|---|
| 1 | A | C | GOLD | 100 | 24 |
| 2 | B | C | GOLD | 200 | 128 |
| 3 | A | C | SILVER | 500 | 128 |
| 4 | B | C | SILVER | 400 | 64 |

The service configuration of service numbers 1–4 involves routers RI, R2 and R3. It is assumed that the mapping between the packet header information from the packets to be received and the service class, for e.g. <all packets from network A destined to network C, GOLD_TOS byte, GOLD service>, is already propagated to the routers involved and the admission control decision of individual routers R1, R2 and R3 are positive, i.e. there are enough resources in the network elements in order to forward the required traffic profile.

In this embodiment, there is no distinction between edge devices and core devices in terms of forwarding behaviour and the following signaling instructions are conceptually sent to routers R1, R2 and R3:

1. Create_virtual_link(port_id=A, <gold_pipe, {100, 24}>)
2. Create_virtual_link(port_id=A, <gold_pipe, {200, 128}>)
3. Create_virtual_link(port_id=A, <silver_pipe, {500, 128}>)
4. Create_virtual_link(port_id=A, <silver_pipe, {400, 64}>)

Figure 2:
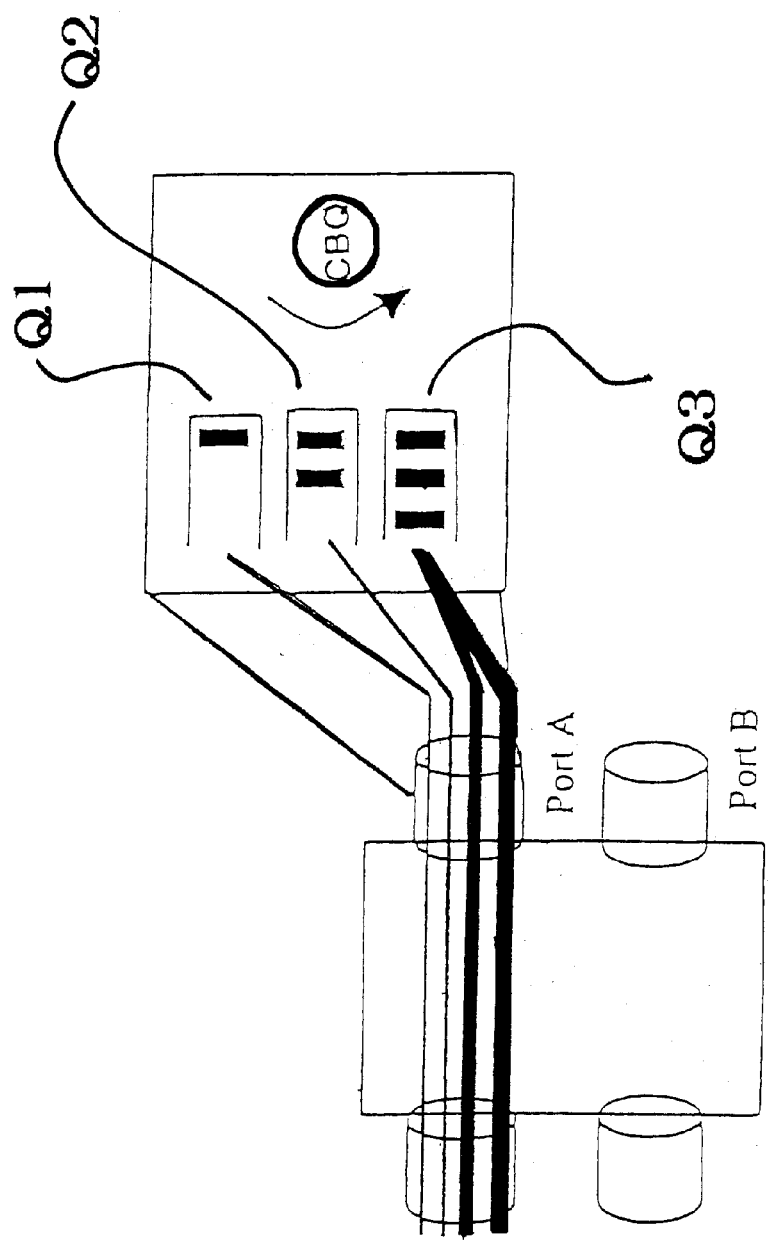
FIG. 2 shows an exemplary queuing arrangement for router R1 of the network of FIG. 1 and FIG. 3 hows a second embodiment of the invention using more than one service controller.

Each instruction has a command, Create_virtual_link, being an instruction to the router to configure itself and reserve resources in accordance with the parameters of the command, in this case three parameters the output port A, the Quality of Service type (Silver or Gold) and a traffic profile parameter (the calculation of bandwidth and burst size) are used. The commands further include a status byte to be returned to the service controller to confirm the configuration (or otherwise) of the router in response to the command. The instruction is sent by the service controller to each router R1–R3. The instruction is translated by the translation program of each router into the configuration information specific to that router to provide the required service. Referring to FIG. 2, in which the configuration of router R1 is shown, the commands 1 to 4 would result in a weighted fair queue (WFQ) scheduler of the router R1 initializing two separate priority-one (Gold service) output queues Q1 and Q2 for port A corresponding to instructions 1 and 2 and one priority-two (Sliver service) output queue Q3 corresponding to instructions 3 and 4. In this case, the Silver service instructions do not have separate queues. The scheduler weights are programmed to deliver requested bandwidth of 100 kbps of Gold service, 200 kbps of Gold service and 900 kbps of aggregated Silver service.

The Create_virtual_link( ) commands 1–4 will be translated into different queue arrangements in routers R2 and R3 since these routers are in this example incapable of per-flow queuing, and thus there will be one priority-one queue and one priority-two queue with schedulers set to deliver 300 kbps of aggregated GOLD service and 900 kbps of aggregated SILVER service across the routers R2 and R3.

The actual commands necessary for router configuration will now be described. The conceptual Create_virtual_link command reserves the resources of routers/switches in a network in a two-phase commit fashion. The first phase triggers the admission control functions and makes a soft booking of resources on routers using an admit_virtualink( ) command. The resources are then committed in a second phase using a commit_virtualink( ) command. The implementation of this two-phase resource reservation system is as follows:

Phase 1: Admission control and soft booking The routers R1–R3 maintain a resource state table of previous commitments of the resources of the router. The table maintained by Router R1 for the services 1,3 and 4, shown in Table 1, assuming these are already committed, would be as shown in Table 2 below:

TABLE 2

Table of previously committed services 1, 2 and 4 of Table 1

| VL Identifier | Booking Status (Soft/Hard) | Type | Bandwidth (kbps) | Average Burst Size (packets) | Memory (normalised) | Buffer (×512 kb) | CPU (%) |
|---|---|---|---|---|---|---|---|
| | | | Requested Resources | | Derived Resources | | |
| 10.10.10.1:2 | Hard | Gold | 100 | 24 | $M_1$ | $B_1$ | $C_1$ |
| 10.10.10.1:8 | Hard | Siver | 800 | 128 | $M_2$ | $B_2$ | $C_2$ |
| 10.10.10.1:10 | Hard | Silver | 400 | 64 | $M_3$ | $B_3$ | $C_3$ |

In the table, each virtual link (VL) has an identifier having two parts, an output port identifier, in this case 10.10.10.1 (Router R1 port A) and a unique virtual is link number, in this case 2, 8 or 10, depending upon the link. A booking status identifying phase 1 (soft) or phase 2 (hard) is given for each virtual link. In this case all three virtual links shown are already committed, so the booking status of each is hard. The table includes two sub-tables of requested and derived resources. The requested resources correspond to the requested services noted in Table 1. The derived resources show how the physical resources of the router in terms of memory size $M_1$, $M_2$, $M_3$ buffer size $B_1$, $B_2$, $B_3$ and percentage of CPU resources $C_1$, $C_2$, $C_3$ are allocated to provide the requested services. The computation of the CPU, buffer and memory required to support a virtual link request is platform dependent, and is managed by the operating system of the router using any suitable algorithm. This may take into account service type, priority, average packet size, averaging interval, an algorithm formula for calculating buffer size, memory size and CPU resources and filter information, or may simply be an empirically derived mapping from the requested to the derived resources.

The information maintained in Table 2 is used to make local admission control decisions during future virtual link requests. During the admission control computation it is necessary to consider the bandwidth availability on a particular link for a particular class of traffic, CPU load, memory usage, buffer usage and other constraints of the platform. This computation may be performed using an admission control algorithm which can be of any desired form. Upon admission is a temporary entry in the above table, a soft state, is created. The admission control functions and the state entry are atomic operations.

In response to a request from a user, application or other service controller, the service controller S determines the routers involved in the service, and the ports of those routers to be used and sends a resource request to each router in the form of an "admit_virtualink" command which triggers admission control functionality of the router. The command is of the following form:

admit_virtualink(interface, service_type, traffic_profile)

The "Interface" parameter is the IP number or the alphabetical name of the port, the "servicetype" parameter corresponds to pre-defined service type, for e.g. Gold or Silver and the "traffic_profile" parameter contains the temporal characteristics of the traffic in terms of bandwidth and burst size. The states created due to admit_virtualink(interface, service_type, traffic_profile) command for service 3 of Table 1 are shown in Table 3. The values for $M_4$, $B_4$ and $C_4$ are determined by the router's operating system and used for local admission control. The parameter x is the unique number which identifies into the new virtual link within the router.

(10.10.10.1:X) command for the new virtual link shown in Table 3 to the router, the router configures its forwarding engine based on the parameters specified in Tables 2 and 3 (existing and new commitments).

In order to do this, the router collates resources corresponding to the virtual links from the resource state table and generates reservation commands to pass to the operating system by combining the information in the state table with, for each service, a command template. p A Cisco 7500 router, as an example platform, with a VIP2-50 module, IOS release 11.1(20)CC installed is used for this service mapping example. This example shows the minimal implementation of a local service creation client using Committed Access Rate (CAR) policy action along with Cisco's weighted fair queuing (WFQ). It is assumed that the services types are identified by IP "type of service" (tos) byte. The following configuration is intended for an inner router that classifies and forwards packets based on IP tos byte, source network address and destination network address for GOLD service type and based only on IP tos byte for SILVER service type. i.e. GOLD service flows are handled on per customer basis while SILVER service type flows are handled in aggregated manner.

An exemplary control template is as follows:
10 #configure terminal
20 #access-list <access-group-number> permit Ip <src-network> <src-wildcard><dst-network> <dst-wildcard> tos <service-tos>
30 #Interface Hssi 0/0/0
40 #rate-limit output access-group <access-group-number> <bps> <burst-size> <burst-size> conform-action transmit exceed-action drop
50 #fair-queue qos-group
60 #fair-queue qos-group <access-group-number> weight <wfq-weight>

TABLE 3

State entry created by the admit_virtualink (10.10.10.1, "Gold", {200, 128}) command from the service controller to an IP router

| VL Identifier | Booking Status (Soft/Hard) | Type | Bandwidth (kbps) Requested Resources | Burst Size (packets) | Memory (normalised) | Buffer (×512 kb) Derived Resources | CPU (%) |
|---|---|---|---|---|---|---|---|
| 10.10.10.1:x | Soft | Gold | 200 | 128 | $M_4$ | $B_4$ | $C_4$ |

Once $M_4$, $B_4$ and $C_4$ have been derived, a check is made to ensure that the total reserved memory, buffer and CPU resources have not been exceeded, in which case the resource state table (Table 2) is updated with the information shown in Table 3, as a soft booking and a "admission granted" response is sent to the service controller together with the virtual link identifier. If, however, the resources of a router have been exceeded, an "admission failed" response is sent to the router and the soft booking is not made.

Phase II: Resource configuration in the router

The second step in configuring a service is to effect the resource requests in the router. The commands that will effect the reservation of corresponding virtual links may be issued via command line interface (CLI), Simple Network Management Protocol (SNMP), General Switch Management Protocol (GSMP) or some non-standard protocols.

An example of the particular set of commands that could, for example, be used to configure a Cisco 7500 router via CLI to provide the requested services will now be given. Once the service controller S decides to reserve the resources, the server S sends a commit_virtualink 70 #fair-queue qos-group <access-group-number> limit <buffer>
80 #end Calling the above template with the following values would program the router with similar effect of services shown in Tables 3 and 4, when entered through the command line interface from a terminal, as shown in Table 5 below.

Call 1:
<access-list>=P, <src-ip>=192.168.10.0, <src-wildcard>= 0.0.0.255, <dst-network>=192.168.30.0, <dst-wildcard>=0.0.0.255, <Service-tos>=GOLD_TOS, <bps>=100000, <burst-size>=X. <wfq-weight>=$W_P$, <buffer>=$B_1$ Call 2:
<access-list>=Q, <src-ip>=192.168.20.0, <src-wildcard>=0.0.0.255, <dst-network>=192.168.30.0, <dst-wildcard>=0.0.0.255, <service-tos>=GOLD_TOS, <bps>=200000, <burst-size>=Y, <wfq-weight>=$W_Q$, <buffer>=$B_4$ Call 3:
    <access-list>=R, <src-ip>=any, <src-wildcard>=" ", <dst-network>=192.168.30.0, <dst-wildcard>=0.0.0.255, <service-tcs>=SILVER_TOS, <bps>=900000, <burst-size>=Z, <wfq-weight>=$W_R$<buffer>=$B_2$ +$B_3$.

TABLE 5

Commands for a Cisco 7500 router
(Router R1 in FIG. 1)
with IOS release 11.1(20)CC \*configure terminal
\*access-list P permit ip 192.168.10.0 0.0.0.255-192.168.30.0 0.0.0.255 tos GOLD_TOS
\*access-list Q permit ip 192.168.20.0 0.0.0.255-192.168.30.0 0.0.0.255 tos GOLD_TOS
\*access-list R permit ip any 192.168.30.0 0.0.0.255 tos SILVER_TOS
\*interface Hesi 0/0/0
\*rate-limit output access-group P 100000 X X
conform-action transmit exceed-action drop
\*rate-limit output access-group Q 200000 Y Y
conform-action transmit exceed-action drop
\*rate-limit output access-group R 900000 Z Z
conform-action transmit exceed-action drop
\*fair-queue qos-group
\*fair-queue qos-group P weight $W_P$
\*fair-queue qos-group P limit $B_1$
\*fair-queue qos-group Q weight $W_Q$
\*fair-queue qos-group Q limit $B_4$
\*fair-queue qos-group R weight $W_A$
\*fair-queue qos-group R limit $B_2 + B_1$
\*end The network addresses 192.168.10.0/24, 192.168.20.0/24 and 192.168.30.0/24 are assumed for source networks A, B and C respectively. It is also assumed that the configuration information regarding the access list parameters GOLD_TOS, SILVER_TOS and network addresses are propagated to the routers statically, or in slow time scales by other means.

Access-group numbers P, Q and R are random, but unique within an interface, chosen by the local service client. The configured access list P determines packets from network A (in FIG. 1) destined to network C with GOLD_TOS byte in the tos field. Similarly, the GOLD service packets from network B to network C are identified by access list Q. All packets destined to network C with SILVER_TOS byte in the tos field is identified by access list R.

Packet burst size X, Y and Z are derived from X =24, Y =128 and Z =128+64. A simple addition of the burst sizes from Tables 2 and 3 is made to handle the worst case situation. While simple addition of burst sizes would allow misbehaving flows to take advantage of the other flows in the same class, flow based policing at the ingress routers can prevent misbehaving flows.

Weights of WFQ -$W_P$, $W_Q$ and $W_R$ are the percentage of the link capacity for Service 1, Service 2 and combined Services 3 and 4 shown in Table 1, respectively. For e.g. $W_P$=(100 Kbps/45 Mbps)\*100\*1.2, $W_Q$ =(200 Kbps/45 Mbps)\*100\*1.2 and $W_R$ =(900 Kbps/45 Mbps)\*100. The service provider sets 20% more bandwidth for GOLD service in order to reduce the delay for GOLD service class.

For the buffer size, a simple sum of the derived buffer requirement may be replaced with the statistically computed buffer requirement for the flows of the same service class sharing the buffer.

Once the virtual link has been committed a "virtual link committed" return value is passed back to the service controller. If, for some reason, the link is not committed, a "virtual link not committed" return value is passed back to the service controller.

Figure 3:
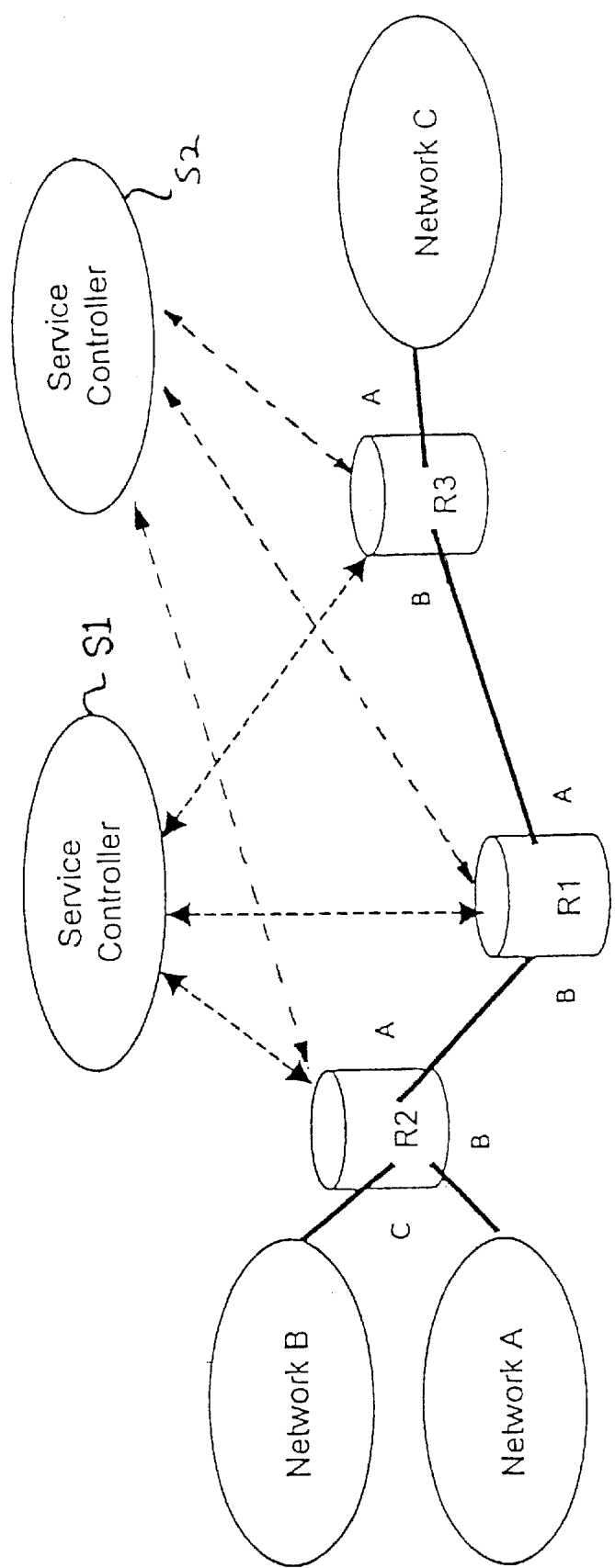

The use of local admission control allows more than one service controller to independently configure a service across the network. This is illustrated in FIG. 3 in which service controllers S1 and S2 have independent logical connections to routers R1–R3.

What is claimed is:

1. A connectionless oriented communications network comprising:
    a plurality of internet protocol network routers that forward network packets, the plurality of routers being controllable by a service controller, the service controller configuring a service across the network by configuring at least some of the routers using router configuration instructions to determine packet forwarding behavior, the router configuration instructions being in a common form;
    wherein each router having associated therewith means for translating the common form router configuration instructions into configuration commands specific to the router.

2. A network as claimed in claim 1 wherein the router configuration instructions comprise a first command reserving resources on the router and a second command committing the resources, the configuration commands being derived from the router configuration instructions only upon receipt of the second command.

3. A network as claimed in claim 1 wherein the translation means comprises a command template, the command template including commands for configurating the router in accordance with the router configuration instructions.

4. A network as claimed in claim 1 wherein each router includes means for providing local admission control.

5. A network as claimed in claim 4 wherein the admission control means comprises a table of committed and reserved resources of the router and means for calculating further resources to be used in configuring a further service through that router.

6. A network as claimed in claim 1 wherein at least one said router is an IP Version 4 or IP version 6 router.

7. A network as claimed in claim 1 wherein each router splits its resources using logically separated bit pipes.

8. A network as claimed in claim 1 wherein each router comprises an operating system and wherein network resources are partitioned and admission is controlled by the operating system.

9. A network as claimed in claim 1 wherein each router configuration instruction is identified by a unique identifier.

10. A network as claimed in claim 1 wherein each router configuration instruction determines packet forwarding behaviour independent of any other configuration instructions.

11. A network as claimed in claim 4 further comprising at least one further service controller that configures a service across the network by configuration of at least some of the routers the service controllers being arranged to configure routers independently.

12. A network as claimed in claim 1 wherein the translation means comprises a translation program and wherein the translation program is different for different types of routers.

13. A connectionless communications network comprising:
    a plurality of internet protocol network routers that forward network packets based on router configuration instructions received from a service controller, the service controller configuring a service across the network by configuring at least some of the routers, the router configuration instructions being in a common form;

wherein each router has an associated translator that translates the common form router configuration instructions into configuration commands specific to the router.

14. A network as claimed in claim 13 wherein the translator comprises a command template that includes commands for configuring the router in accordance with the router configuration instructions.

15. A network as claimed in claim 13 wherein each router comprises a local admission controller.

16. A network as claimed in claim 15 wherein the admission controller comprises a table of committed and reserved resources of the router and a calculator that calculates further resources to be used in configuring a further service through the router.

17. A network as claimed in claim 13 wherein the translator comprises a translation program and wherein the translation program is different for different types of routers.

* * * * *

UNITED STATES PATENT AND TRADEMARK OFFICE
CERTIFICATE OF CORRECTION

PATENT NO.   : 6,778,523 B1
DATED        : August 17, 2004
INVENTOR(S)  : R. Masilamany It is certified that error appears in the above-identified patent and that said Letters Patent is hereby corrected as shown below:

Title page,
Item [57], ABSTRACT, after "Controller S" insert -- , --.

Column 8,
Line 54, after "routers" insert -- , --.

Signed and Sealed this

Twenty-eighth Day of June, 2005

JON W. DUDAS
*Director of the United States Patent and Trademark Office*